(12) United States Patent
Doherty et al.

(10) Patent No.: US 8,139,871 B2
(45) Date of Patent: Mar. 20, 2012

(54) CIRCUIT AND METHOD FOR ADAPTIVE, LOSSLESS COMPRESSION OF SUCCESSIVE DIGITAL DATA

(75) Inventors: Donald B. Doherty, Richardson, TX (US); Alan S. Hearn, Allen, TX (US)

(73) Assignee: Texas Instruments Incorporated, Dallas, TX (US)

(*) Notice: Subject to any disclaimer, the term of this patent is extended or adjusted under 35 U.S.C. 154(b) by 1035 days.

(21) Appl. No.: 11/957,922

(22) Filed: Dec. 17, 2007

(65) Prior Publication Data
US 2009/0154819 A1    Jun. 18, 2009

(51) Int. Cl.
*G06K 9/36* (2006.01)

(52) U.S. Cl. ........ 382/232; 382/244; 382/281; 711/108; 711/168; 711/164; 365/49; 365/189.07; 365/230.01; 365/230.03

(58) Field of Classification Search .................. 382/232, 382/281, 199, 203, 239, 244; 711/108, 157; 365/49, 189.07, 230.01, 230.03
See application file for complete search history.

(56) References Cited

U.S. PATENT DOCUMENTS

| | | | |
|---|---|---|---|
| 5,623,262 A * | 4/1997 | Normile et al. .................. 341/67 |
| 5,832,138 A * | 11/1998 | Nakanishi et al. ............. 382/281 |
| 6,069,573 A * | 5/2000 | Clark, II et al. .................. 341/50 |
| 6,697,276 B1 * | 2/2004 | Pereira et al. .............. 365/49.17 |
| 6,708,250 B2 * | 3/2004 | Gillingham .................... 711/108 |
| 7,526,029 B2 * | 4/2009 | Román et al. ............. 375/240.23 |
| 2005/0249286 A1 | 11/2005 | Nicolas |
| 2005/0265614 A1 | 12/2005 | Seong et al. |
| 2006/0069857 A1 * | 3/2006 | Lekatsas et al. ............... 711/108 |
| 2007/0002059 A1 | 1/2007 | Booth et al. |
| 2007/0061022 A1 | 3/2007 | Hoffberg-Borghesani et al. |
| 2007/0194702 A1 * | 8/2007 | Jeng et al. ...................... 313/506 |
| 2010/0077141 A1 * | 3/2010 | Achler .......................... 711/108 |

* cited by examiner

*Primary Examiner* — Brian Q Le
*Assistant Examiner* — Mekonen Bekele
(74) *Attorney, Agent, or Firm* — Warren L. Franz; Wade J. Brady, III; Frederick J. Telecky, Jr.

(57) ABSTRACT

An image compression and decompression method compresses data based upon the data states, and decompresses the compressed data based upon the codes generated during the compression.

14 Claims, 7 Drawing Sheets

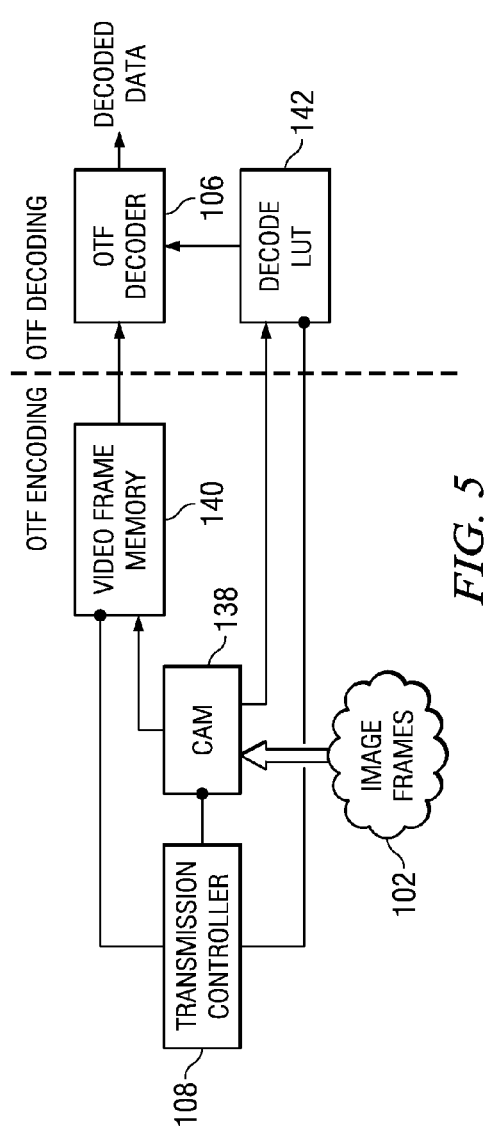
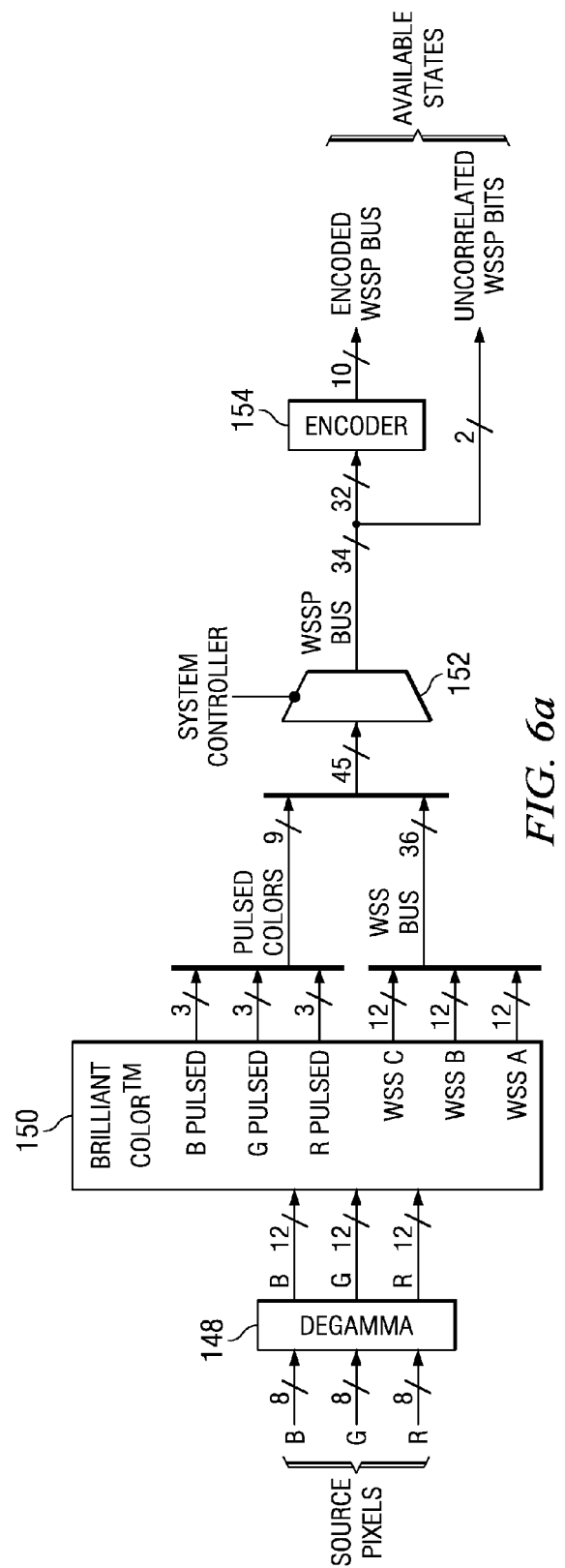

CIRCUIT AND METHOD FOR ADAPTIVE, LOSSLESS COMPRESSION OF SUCCESSIVE DIGITAL DATA

TECHNICAL FIELD OF THE DISCLOSURE

The technical field of this disclosure is related to the art of data compressions, and more particularly to the art of circuits and methods for adaptive and lossless compression of digital data, especially digital image data for use in digital imaging applications.

BACKGROUND OF THE DISCLOSURE

Data compression has long been recognized as an effective technique to reduce requirements on data storage, data processing, and data transmissions. Among a wide range of existing data compression schemes, lossless data compression is a class of compression methods that compress data while maintaining the data integrity.

In current digital imaging applications, a digital image is often stored, processed, and/or transmitted based upon pixels of the image (hereafter image pixel). Information of the image pixels, such as lumen and chromatic information of image pixels, is often carried by a large quantity of image data, such as 32-bits image data, so as to achieve high fidelity images with accurate colors and brightness. As the sizes and the numbers of image pixels increase, the quantity of the image data representing the image pixels increases. As a consequence, the system requirements, such as the bandwidth, on storing, processing, and/or transmitting image data are increased significantly.

Therefore, what is desired is a data compression method and apparatus capable of performing lossless data compression, especially performing lossless and adaptive compression for image pixel data.

SUMMARY

In one example, a method for processing a stream of pixel data of a set of image pixels is disclosed herein. The method comprises: receiving a set of pixel data of one of the set of image pixels; and compressing the received pixel data based upon a pixel state of the received pixel data.

In another example, a method for processing a stream of correlated digital data with each digital data comprises a number of digital bits is disclosed herein. The method comprises: dividing the stream of digital data into a plurality of data sections with each data section comprising at least one digital data; sequentially loading the digital data in one data section; and compressing the loaded digital data using a mapping table such that the mapping table stores only unique data states of the loaded digital data, and each entry in the mapping table corresponds to an index.

In yet another example, a codec device for processing a stream of pixel data of a set of image pixels is disclosed herein. The method comprises: receiving means for receiving a set of pixel data of one of the set of image pixels; and compression means for compressing the received pixel data based upon a pixel state of the received pixel data.

In yet another example, an image display system is provided. The display system comprises: a light valve comprising an array of individually addressable pixels; and an image processing unit for preparing a set of image data for the pixels of the light valve, comprising: a codec for compressing and decompressing a stream of image data of an array of image pixels of an image frame from an image source, further comprising: receiving means for receiving the image data stream; and compression means for compressing the received image data such that the image data of each image pixel are compressed at one time.

BRIEF DESCRIPTION OF DRAWINGS

FIG. 5 is a diagram illustrating a data compression/decompression system in an image system;

FIG. 6a is a diagram illustrating an exemplary data compression/decompression scheme in an image system;

FIG. 6b diagrammatically illustrates the compression operation of the compression/decompression scheme in FIG. 6a;

FIG. 6d diagrammatically illustrates the data decompression operation of the compression/decompression system in FIG. 6a;

DETAILED DESCRIPTION OF SELECTED EXAMPLES

Disclosed herein is an adaptive and lossless data compression/decompression method. The compression/decompression method is capable of compressing/decompressing data, especially image pixel data losslessly and adaptively such that the data integrity is maintained; and the compression/decompression is performed based upon the nature of the input data, such as the lengths and/or patterns carried by the data to be compressed. A circuit capable of performing the data compression/decompression is further provided.

The data compression/decompression and the circuit will be discussed in the following with reference to particular examples. It will be appreciated by those skilled in the art that the following discussion is for demonstration purpose, and should not be interpreted as a limitation. Other variations within the scope of the disclosure are also applicable.

Figure 1:
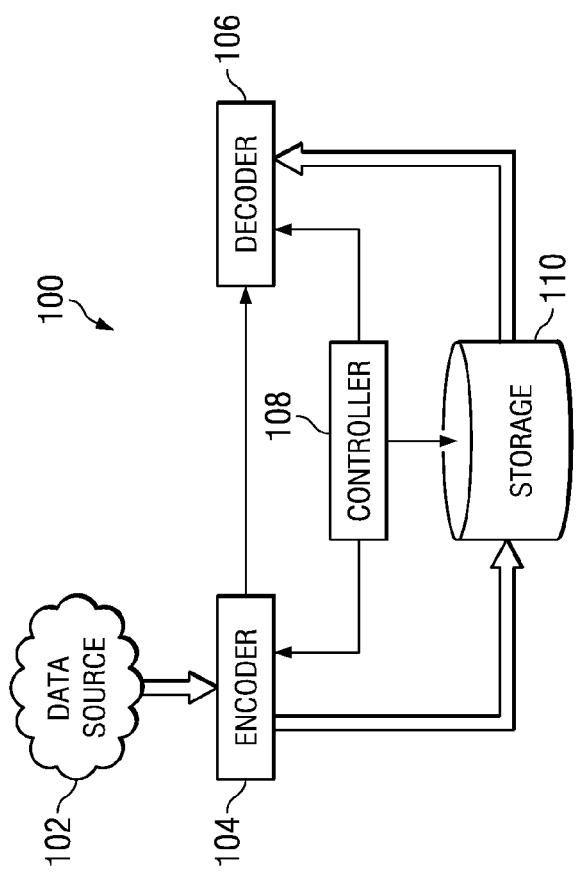
FIG. 1 schematically illustrates a diagram of an exemplary data compression and decompression scheme.

Referring to the drawings, FIG. 1 diagrammatically illustrates a data compression/decompression system 100. The system 100 in this example comprises encoder 104, decoder 106, controller 108, and storage 110.

The encoder 104 is in connection to data source 102 that contains data, such as successive digital data to be processed. The encoder 104 compresses the input data from the data source and stores the encoded data, as well as encoding information necessary for the following decoding processes, into storage 110. The decoder 106 receives compressed data, as well as the information of the compression from the storage 110, and decompresses the received data based upon the received compression information. In an alternative example, the encoder compresses the input data and delivers the compressed data into the storage. The compression information can be delivered to the decoder. This method is especially useful in performing the compression/decompression on-the-fly. Operations of the encoder, decoder, storage, and data transmissions therebetween are controlled by controller 108.

The compression/decompression system 100 is capable of performing adaptive and lossless compression/decompression for input data. A lossless compression/decompression is referred to as a compression/decompression wherein the compressed data can be substantially fully recovered after the decompression such that the original data integrity is substantially maintained. An adaptive compression/decompression is referred to as a compression/decompression wherein the compression and/or the decompression are performed based upon the nature of instant incoming data to be processed.

The input data, which is stored in data source, can be digital data or other types of data. When the data is digital, the digital data can be correlated successive digital data or non-correlated digital data. An example of correlated digital data is image data of digital images. Specifically, the image data can be successive pixel data associated with image pixels of an image or images of a stream of image frames.

Figure 2:
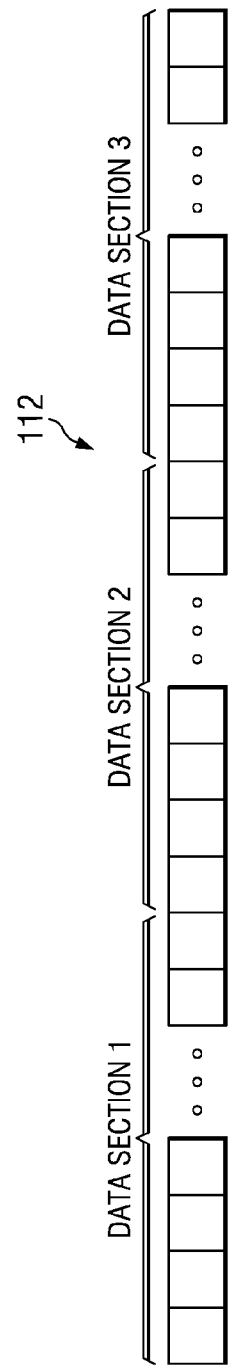
FIG. 2 schematically illustrates a set of digital data that is divided into a plurality of data segments to be compressed.

For compressing/decompressing the digital data, the stream of input digital data into encoder 104 can be divided into data sections, as schematically illustrated in FIG. 2.

Referring to FIG. 2, each square represents a bit such as "0" or "1" of input data stream 112 to be processed. Based upon the size of the allocated memory in the storage 110 for processing the data, especially based upon the size of the lookup table (LUT) employed for compressing the data, which will be discussed afterwards, the data stream is divided into data sections. For demonstration purpose, the example shown in FIG. 2 divides the input data stream into data section 1, data section 2, and data section 3. Each data section has at least one data, such as at least one data bit. Different data sections may or may not have the same amount of data. When the data stream is an image data stream, each data section can correspond to an image pixel of an image frame; and the successive data sections (adjacent data sections) correspond to successive (adjacent) image pixels of an image frame. For example, image data in data section 1 can correspond to the $(1, 1)^{th}$ image pixel of an image frame; and data section 2 corresponds to the $(1, 2)^{th}$ image pixel of the same image frame.

The sectioned data stream is compressed based on the data sections by the compression/decompression. Specifically, data in each data section are compressed at one time; and data in consecutive data sections are compressed successively. The compressed data can be stored in storage. When decompression is initiated, the compressed data can be retrieved from the storage; and are recovered losslessly. Alternatively, the compressed data can be directly delivered to the decoder that decodes the compressed data dynamically. In particular, the compression and decompression either or both can be performed on-the-fly. For example, a stream of data can be loaded to the decoder in a way such that the data stream is loaded according to the data sections, such as the data sections in FIG. 2. This data loading can be accomplished through the controller (108). When the data in a data section are loaded completely, the decoder can start to compress the data in the loaded data section. The compressed data can then be stored or delivered to the decoder for decompression.

The data sections of a data stream can be processed (compressed and decompressed) sequentially by one encoder and decoder. Alternatively, multiple encoders and/or decoders can be provided and juxtaposed such that substantially identical compression and/or decompression threads can be performed in parallel. The multi-compression and/or decompression threads may or may not be performed simultaneously; but preferably are synchronized so as to maintain the data integrity.

Data in data sections are compressed based on the states of the data sections. Because each data section comprises a sequence of digital data, the combination and the arrangements of the digital data in the data section together are referred to as a "state of the data section." In examples wherein the digital data are image data of image pixels (hereafter pixel data) in an image frame, each data section corresponds to the pixel data of an image pixel; while a set of data sections (a set of pixel data) corresponds to the image data of an image frame. For example, an image frame may comprise 1920×1080 image pixels; and each image pixel can be represented by 4 bits, 8 bits, 16 bits, 32 bits, 64 bits, 128 bits, or 256 bits. The data stream of the image frame comprises 1920×1080 data sections. Each data section corresponds to an image pixel and comprises 4 bits, 8 bits, 16 bits, 32 bits, 64 bits, 128 bits, or 256 bits data.

In the following, compression and decompression of the system 100 will be discussed with reference to examples wherein the digital data to be compressed are correlated image pixel data of image frames. Each data section corresponds to an image pixel; and the image pixels are sequentially compressed and decompressed. After processing the pixel data of an entire image frame, pixel data of another image frame can be loaded into and processed by the compression/decompression system 100. It will be appreciated by those skilled in the art that the compression and decompression method and circuits of the same to be discussed in the following can be used for processing other types of data, such as non-correlated digital data. The data sections can alternatively be processed in parallel by multi-threads.

Figure 3:
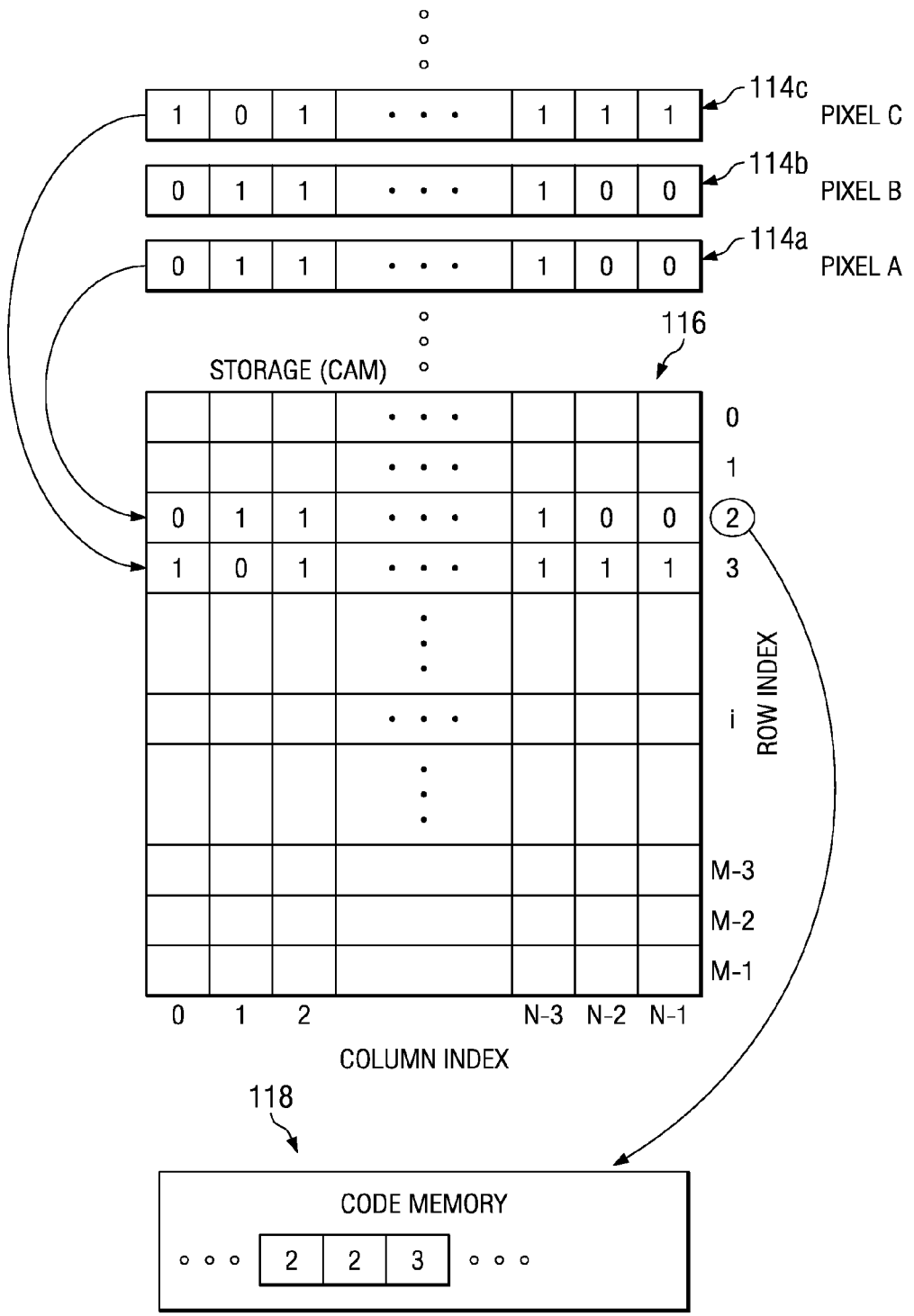
FIG. 3 diagrammatically demonstrates an exemplary data compression for a sequence of image data.

An exemplary compression operation of the compression/decompression system 100 in FIG. 1 is diagrammatically illustrated in FIG. 3. Referring to FIG. 3, data sections 114a, 114b, and 114c correspond to the pixel data of three image pixels A, B, and C, of an image frame respectively. Pixel data of image pixels A and B are assumed to have the same state, while the pixel data of image pixel C has a different state.

Upon receiving pixel data 114a of pixel A, the content-addressable-memory (CAM) of the encoder (104 in FIG. 1) detects if it already has an entry matching the pixel data 114a. Because there is no entry in the CAM matching the pixel data 114a, a new entry is added to the CAM using the next unused location, such as location 2 (which corresponds to the row number of the CAM). The sequential number (2) of the location becomes the code for the pixel data 114a, and the location (2) is sent to code memory 118 as the code for data 114a. The code memory can be a video frame memory of an image display system. Compression of pixel data 114a is then finished; and the next pixel data are loaded.

Upon receiving the next pixel data 114b of the next image pixel (pixel B), the CAM detects that there is already an entry (the entry at location 2) matching the pixel data 114b because pixel data 114b has the same state as pixel 114a. The location (2) of the matching entry becomes the code for pixel data 114b; and the location (2) is sent to the code memory 118 as the code for compressed data 114b. The compression for data 114b is then finished; and the next pixel data are loaded.

Upon receiving pixel data 114c of image pixel C, the CAM detects that there is no entry in the CAM matching the state of pixel data 114c, the CAM adds a new entry at the next unused location, such as location 3. The sequential number (3) of the location becomes the code for pixel data 114c, and the location (3) is sent to code memory 118 as the code for data 114c.

The above compression process continues until the pixel data of all image pixels in an image frame are processed. At the end of each image frame, the number of entries in the CAM is equal to the number of unique pixel data states in the image frame. The contents of the CAM can be forwarded to the decoder (106 in FIG. 1) for decompressing the compressed pixel data based on the forwarded CAM contents, as well as the codes in the code memory 118 associated with the forwarded CAM contents. Alternatively, the forwarding can be performed as each new code is detected.

As the CAM stores unique pixel data states, there may be an instance wherein a new pixel data state is received but the CAM has no more memory space for the new pixel data, which causes overflow in the CAM. This problem can be mitigated by setting the new pixel data to replicate the pixel data in the previous location, which corresponds to the left-neighbor image pixel. Because it is possible for an overflow to occur on the leftmost image pixel of a scanning line in a raster scanned video display, the substitution of the image pixel data can be generation of a black image pixel or replicating the top-neighbor image pixel. In order to have a known code that represents black, the zero CAM location (or any other designated CAM location (e.g. the last location) can be set to the zero or any other reserved image data states at each initialization of a new image frame.

The number of CAM states used and the number of CAM overflows caused by each data set (image data of an image pixel) can be monitored by a system control processor, such as controller 108 in FIG. 1. When incoming pixel data allows, the CAM capacity can be reduced and the compressed bus bit(s) can be used for other purposes. For example wherein the CAM employs 12 bits, 10 bits out of the 12 bits of the CAM can be designated for compressing pixel data, while the remaining 2 bits can be reallocated for other purposes. Depending upon the nature of the input pixel data, the number of designated bits for compression and the bits reallocated for other purposes can be dynamically changed. If it is detected that the number of CAM overflows is equal to or larger than a threshold when operating in a reduced-bit mode, the CAM can be restored to the full capacity operation mode wherein all possible bits of the CAM are assigned for performing the compression. As a way of example in video processing, a CAM is capable of operating with 512 or 1024 size (total number of entries) and producing a 9 or a 10 bit code. The $10^{th}$ bit of a 10-bit CAM can thus be assigned for other purposes, such as assigned for processing the blue color channel of a color image.

It can be seen from the above example that the compression is an adaptive operation, wherein the content and the code are generated based upon the states of the input data to be compressed. There is no need to predetermine the contents in the CAM or the codes in the code memory.

Figure 4:
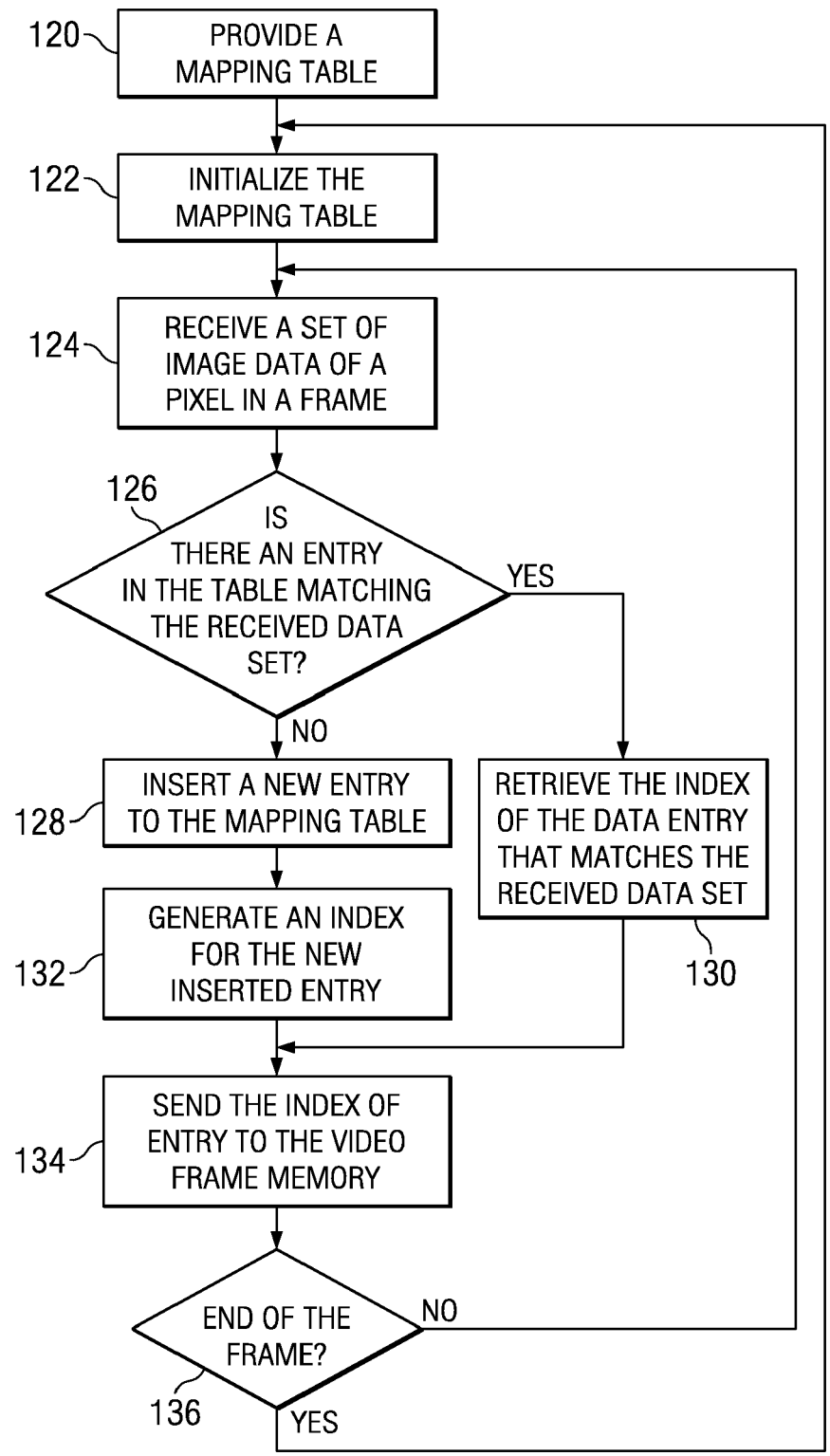
FIG. 4 is a flow chart showing the steps executed in performing the data compression in FIG. 3.

The above compression operation can be summarized by the flow chart illustrated in FIG. 4. Referring to FIG. 4, a mapping table is generated at step 120. The mapping table can be implemented as a content-addressable-memory (CAM), such as a smart CAM. The mapping table comprises M rows and N columns with N being determined based upon the length of each pixel data, such as 16 bits, 32 bits, 64 bits, and 128 bits or any other suitable numbers. M can be any suitable numbers. In one example, M can be equal to or less than the total number of image pixel rows of the image frame.

The mapping table is cleared (initialized) at step 122. Upon receiving image data of an image pixel at step 124, it is determined by the CAM if there is an entry in the mapping table matching the received pixel data (step 126). If there is no matching entry, the state of the received pixel data is inserted into the mapping table as a new entry (step 128), and an index to the inserted new entry is generated at step 132. The generated index can be an index to the location (e.g. the memory address) of the new added entry in the mapping table. Alternatively, the index can be the sequential number of the location of the new added entry in the mapping table relative to other entries in the mapping table as demonstrated in FIG. 4. The generated index is sent to a code memory, such as a video frame memory, as the "compressed image data" in place of the row uncompressed image data.

If it detected that there is an entry in the mapping table matching the received image data state at step 126, the index of the existing entry in the mapping table is retrieved at step 130, and the retrieved index is sent to the video code memory (e.g. video frame buffer).

After sending the index at step 134, it is further determined if all pixel data of the image frame have been processed at step 136. If the pixel data of all image pixels in the image frame have been processed (compressed), the process flows to the beginning of step 122 wherein the mapping table is initialized for the pixel data of pixel images in a new (next) image frame. The process then continues until all desired frames are processed or interrupted intentionally, for example, intentionally stopped by a customer.

It is noted that the compression scheme as discussed above with reference to FIG. 1 through FIG. 4 can be implemented as a multiple-threads compression scheme. Specifically, instead of loading and compressing pixel data of single image pixel, the compression/decompression system can be implemented by incorporating juxtaposed multiple encoding and/or decoding units with each encoding/decoding unit being capable of performing the compression/decompression processes as discussed above. As a consequence, pixel data of multiple image pixels can be concurrently or simultaneously loaded and processed by separate decoding/encoding units.

The compression/decompression scheme can be implemented in many ways for processing image data, one of which is schematically illustrated in FIG. 5.

Referring to FIG. 5, CAM 138 is provided on the encoding side. The CAM 138 is in connection with image data source (image frames) 102 and to transmission controller 108 that can be a functional member of controller 108 illustrated in FIG. 1. The CAM detects the states of the input image data by comparing the set of image data of each image pixel to the stored entry in the CAM, and generates indices of the unique data entries in the CAM. The generated indices of unique entries in the CAM are stored in video frame memory 140.

On the OTF (on the fly) decoding side for decompressing the compressed image data, the contents of the CAM (unique entries) are transmitted to decoder lookup table (LUT) 142. The transmission can be controlled and accomplished through the transmission controller 108. OTF decoder 106 decompresses the codes in the video frame memory (140) with reference to the transmitted CAM contents in the decoder LUT 142 so as to losslessly recover the image data. The decompressed image data are then output from OTF decoder 106.

As an implementation of the compression/decompression system illustrated in FIG. 5, FIG. 6a through FIG. 6e diagrammatically illustrates an exemplary compression/decompression operation for image data in a digital display system. In the example, as will be discussed in the following, it is assumed that red, green, and blue color components each are represented by 8 bits, and the compressed codes each are represented by 10 bits. However, it is only an example for demonstration purposes. Other color representation schemes are also applicable.

Referring to FIG. 6a, RGB pixel data with 8 bits for each R, G, and B color component of an image pixel are input to unit 148 that performs the degamma operation. With the degamma operation, the input RGB pixel data are converted to display system-specific RGB pixel data with each R, G, and B color component being represented by 12 bits. The gamma corrected RGB data are input to BrilliantColor™ unit (a product by Texas Instruments, Inc.) 150 that converts the input RGB data into WSS (white, secondary colors, and spoke colors) data and pulsed color data. The pulsed color data comprises a 3-bits pulsed red (R) color component, a 3-bits pulsed green (G) color component, and a 3-bits pulsed blue (B) color component. The pulsed R, G, and B color components are combined into a 9-bits pulsed color component in a 9-bits pulsed color bus. The WSS data comprises three 12-bits buses. The WSS colors components are combined into 36-bits WSS color components in a 36-bits WSS bus. The 9-bits pulsed bus and 36-bits WSS bus are joined into a 45-bits bus as an input to multiplexer 152 that is controlled by system controller.

Multiplexer 152 outputs a WSSP bus signal with 34 bits as configured by the system controller. Thirty-two bits of the selected 34-bits WSSP bus signal are input to encoder 154; while the remaining uncorrelated 2 bits of the selected 34 bits are delivered bypassing the encoder 154. The encoder compresses the input 32 bits and outputs 10-bits compressed image data (codes).

Figure 6B:
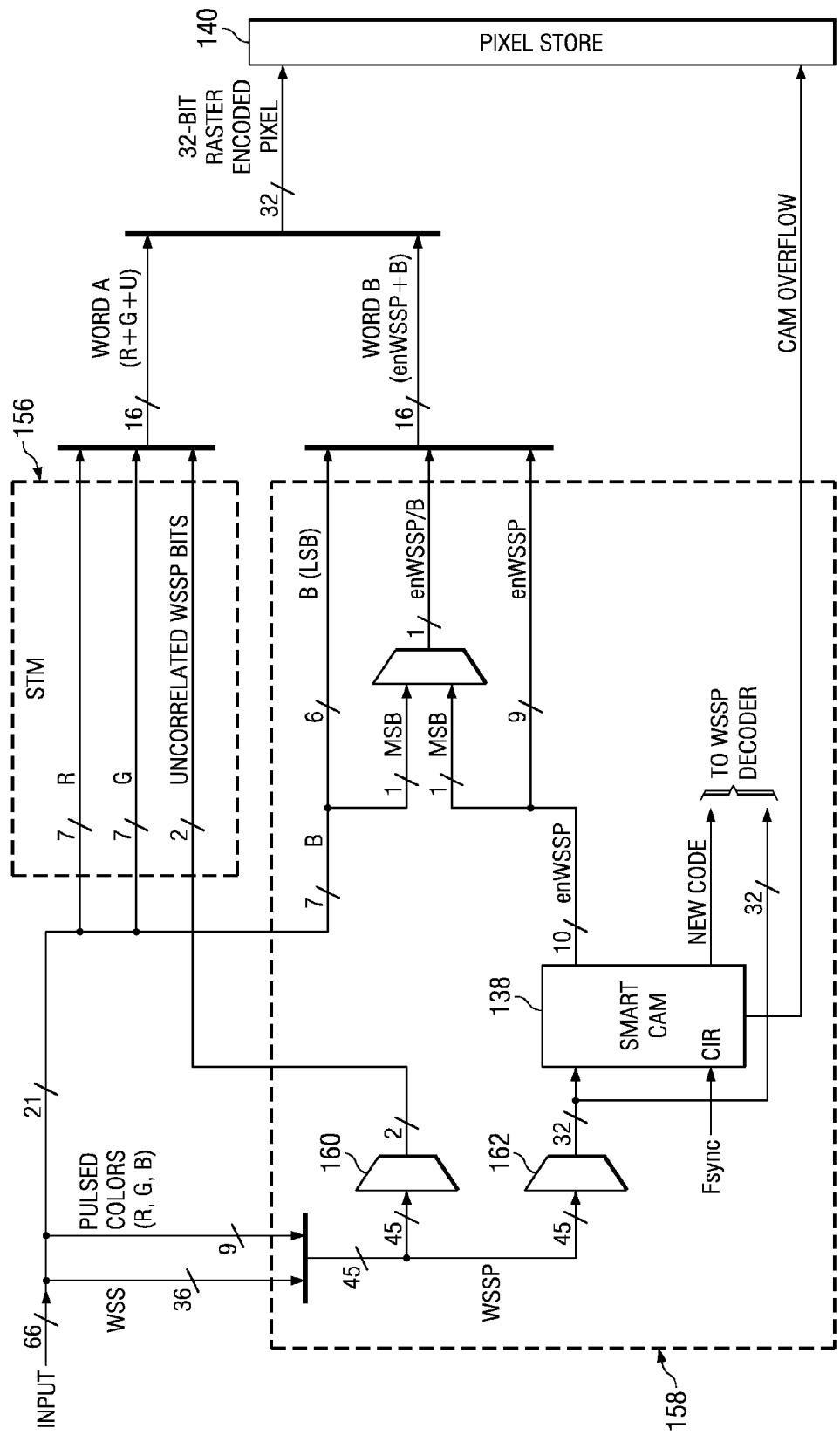

The operations for compressing the 36-bits WSS and 9-bits pulsed color signals in FIG. 6a are diagrammatically illustrated in FIG. 6b.

Referring to FIG. 6b, in addition to the 36-bits WSS and 9-bits pulsed color signals, the input data signal comprises another 21-bits signal as illustrated in FIG. 6b. The total number of bits in the input signal can be 66 bits. The R, G, and B data (each having 8 bits as illustrated in FIG. 6a) are pre-compressed into pre-compressed 7-bits R, 7-bits G, and 7-bits B data by word A encoder 156. The pre-compressed 7-bits R and 7-bits G signals are combined with the 2-bits uncorrelated WSSP signal (from word B encoder 158 as will be discussed in the following) into word A with 16 bits as illustrated in FIG. 6b. The 7-bits B component is fed into word B encoder 158.

The 36-bits WSS signal and 9 bits pulsed RGB color signal (from the 66 bits input) are extracted from the input 66-bits signals, and recombined into a 45-bits signal at the entrance of word B encoder 158. The combined 45-bits WSSP signal (WSS signal plus the pulsed color signal) is passed through multiplexer 160 that outputs the 2-bits uncorrelated signal. The 2-bits uncorrelated signal is forwarded to word A encoder 156 and combined with the 7-bits red, and 7-bits green color signals.

The 45-bits WSSP signal is also input to multiplexer 162 that outputs a 32-bits correlated image data signal to be compressed (as the input to encoder 154 in FIG. 6a). Under the control of frame synchronization signal Fsync, Smart CAM 138 compresses the input 32-bits image data into 10-bits compressed WSSP data (enWSSP) and provides new codes by a compression method as discussed above with reference to FIG. 3 through FIG. 5. The 10-bits enWSSP data are unique image data states in the CAM, and the new codes are the indices of the unique image data states and are stored in the video frame buffer. It is noted that the 32-bits input to the Smart CAM (138) can be processed and stored in parallel.

As discussed above, one or more CAM bits can be reassigned for other purposes than performing the compression. One bit of the CAM bits in this example is reassigned for processing the blue color component depending upon the overflow of the CAM. Specifically, the MSB (most significant bit) of the 10-bits enWSSP signal output from CAM 138 is extracted and input to a multiplexer with the MSB of the pre-compressed 7-bits blue color (B) signal. The multiplexer outputs the 1-bit MSB of the enWSSP signal or the MSB blue color component depending upon the system configuration.

The remaining 6-bits blue color (excluding the MSB) signal is combined with the multiplexer output signal enWSSP/B and the 9-bits (out of the 10-bits enWSSP excluding the MSB) are combined so as to form a 16-bits word B. It can be seen that because 1 bit of the CAM is reassigned to process the MSB (or can be other bit(s)) of the blue color component, the 17-bits (10-bits of enWSSP and 7-bits pre-compressed blue color component) combined signal can be reduced to a word B signal with fewer bits, such as 16 bits.

The 16-bits word A and 16-bits word B are combined into a 32-bits signal; and the combined 32-bits signal is stored in pixel storage 140. The new code and the 32-bits uncompressed image data (input to CAM 138) can be delivered to a decoder (e.g., a WSSP decoder) for decompression. The CAM overflow signal(s) can also be stored in pixel storage 140. The storing processes for the above data are diagrammatically illustrated in FIG. 6c.

Figure 6C:
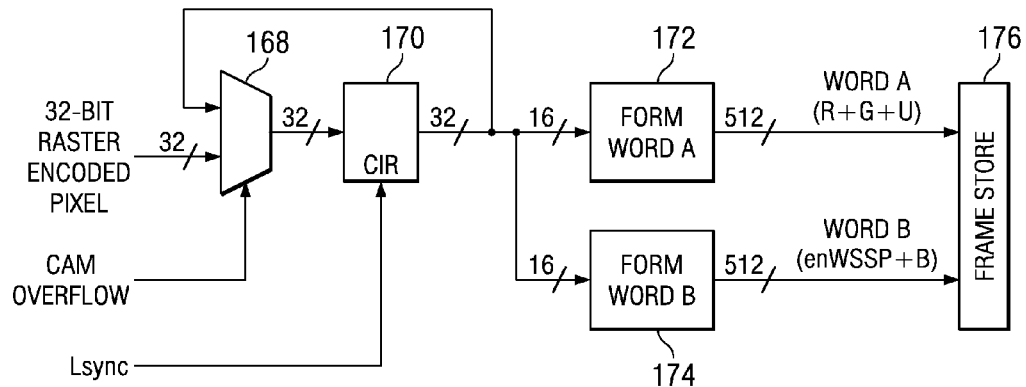
FIG. 6c schematically illustrates the compressed data in a storage after the compression operation in FIG. 6b.

Referring to FIG. 6c, the compressed image data are stored in a corner-turn fashion wherein the image data are compressed and stored corresponding to the image pixels in the image frame; and the image data of image pixels in different pixel rows of the image frame are differentiated. For this purpose, multiplexer 168, latch 170, word A formatter 172, word B formatter 174, and frame storage 176 are provided for storing the compressed image data and other compression information necessary for the following decompression.

Multiplexer 168 and latch 170 form a process loop, wherein the output of latch 170 is fed back as an input of multiplexer 168. The 32-bits raster encoded pixel data (from the combination of word and word B in FIG. 6b) is delivered to an input of multiplexer 168. The CAM overflow signal is used as a control signal of multiplexer 168. The 32-bits output of multiplexer 168 is passed to latch 170; and the 32-bits output of latch 170 is looped back to an input of multiplexer 168 to repeat the previous (left-neighbor) pixel upon a CAM overflow. Under the selection signal Lsync, latch 170 outputs 32-bits compressed image data in a form corresponding to the image pixels in the image frame. The Lsync control signal clears the output of latch 170 to set a black pixel for CAM overflow on the first pixel of a line. The 32-bits output data from latch 170 is divided into word A and word B with each word having 16 bits. Each 16-bits word A and word B is image data of single image pixel. The 16-bits word A and word B are respectively input to word A formatter 172 and word B formatter 174. The word formatters 172 and 174 each format the input 16-bits image data of 32 image pixels into 512-bits words, such as 512-bits word A (comprising R, G, and the 2-bits uncorrelated signals) and word B (comprising enWSSP signal and the blue color component).

The formatted 512-bits word A and word B are then stored in frame storage 176. It is noted that 512-bits word A and 512-bits word B can be stored in parallel into the frame storage. This storing mechanism is advantageous in preventing disturbance of the compression and decompression operations.

The compressed and stored image data can then be retrieved for the following processes, such as decompression and display. An exemplary decompression operation is diagrammatically illustrated in FIG. 6d.

Figure 6D:
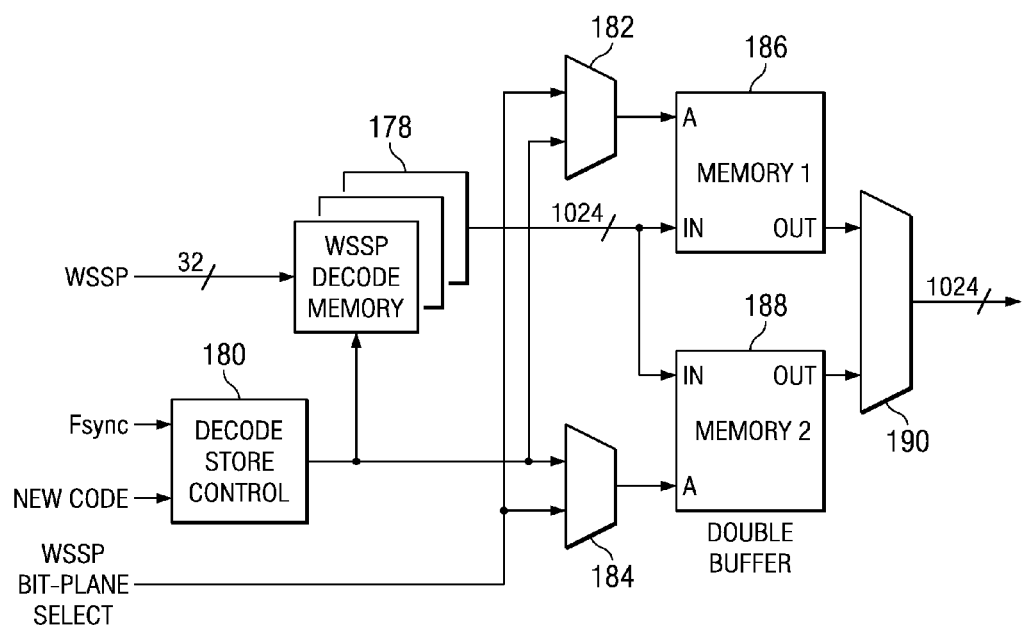

Referring to FIG. 6d, WSSP decode memory 178, decode store controller 180, multiplexers 182 and 184, and memories 1 (186) and 2 (188) are employed. These functional members are deployed for decompressing the compressed image data; and at the same time, differentiate the compressed image data for different image pixel rows and different image frames. In the raster scanning display, it is necessary to notify the displaying of the starting and finishing timing of the image frames, as well as new bitplanes. For this purpose, the frame synchronization signal Fsync and the WSSP bitplane select signal are used as control signals for the decompression. Accordingly, the above functional members are configured into two juxtaposed data processing flows for successive frames. As such, when one flow channel is being used for processing (decompressing and generating bitplanes) one frame, the image data for generating the next frame can be routed to the other unused flow channel.

The 32-bits WSSP signal is loaded to WSSP decode memory 178 that is a double-buffered memory. It is noted that the 32-bits WSSP signal comprises the unique image data states generated in the CAM as discussed above with reference to FIG. 6a and FIG. 6b.

The frame synchronization signal Fsync and the new code signal generated by the CAM during the compression are input to decode store controller 180 that outputs control signals for controlling the input and output of WSSP decode memory 178. The 1024-bits output of WSSP decode memory 178 is delivered to the input pin In of memory 1 (186).

The output of decode store controller 180 is also input to multiplexer 184 that has another input for receiving the WSSP bitplane selection signal. Multiplexer 184 selects from the input WSSP bitplane selection signal and the output from decode store controller 180 as an output; and delivers such output to memory 1 (186).

Multiplexers 182 and 184 are configured for a frame so that either memory 1 (186) or memory 2 (188) is used for writing decode data and the other is used for reading decode data. WSSP decode memory 178 and decode store controller 180 generate the data and address for writing while WSSP bitplane selection signal supplies the address for reading. The read data is used to decode each bitplane as required by the display in the OTF decoder 106 in FIG. 5. Multiplexers 182, 184, and 190 are reconfigured for each succeeding frame to switch memory 1 (186) and memory 2 (188) between reading and writing.

Each one of the memory 1 (186) and memory 2 (188) has a dimension of 1024×32 bits. The memory 1 (186) and memory 2 (188) each outputs a 1024-bits signal; and the two 1024-bits signals are introduced to multiplexer 190 that outputs a 1024-bit bitplane decode signal selected from one of the two input 1024-bit signals as illustrated in FIG. 6d. The generated bitplanes can then be delivered to the light valve pixels of the display system for displaying.

Figure 6E:
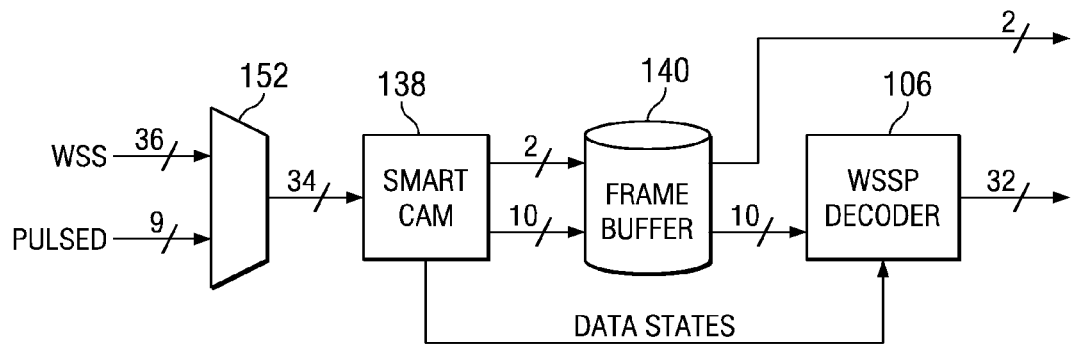
FIG. 6e diagrammatically summarizes the compression operation and the data storing operations in FIG. 6b through FIG. 6d.

The above compression and decompression can be summarized by the diagram in FIG. 6e. Referring to FIG. 6e, 36-bits WSS image data and 9-bits pulsed color data are introduced to multiplexer 152 that selects a 34-bits signal from the input 36-bits WSS image data and 9-bits pulsed color data signals. The selected 34-bits signal is compressed by smart CAM 138 into 10-bits codes and 2 bits uncorrelated signals. The 10-bits codes and 2-bits uncorrelated signals are stored in frame buffer 140. When a decompression operation is triggered, 10-bits codes of the compressed data are loaded to the WSSP decoder 106 that decompresses the loaded data based upon the decode information (e.g., the unique data states generated at the CAM). The decompressed image data each has 32 bits. The 2-bits uncorrelated signal is retrieved from frame buffer 140 and combined with the 32 decoded bits. As such, the original image data with 34 bits can be losslessly recovered after decompression.

The functional modules for performing the compression and decompression as discussed above can be implemented in many ways in a system. For example, one or more functional modules can be implemented as standalone software modules stored as computer executable instructions in a system. Alternatively, one or more functional modules can be implemented as designated electronic circuits, such as application specific integrated circuits (ASIC), field programmable gate array (FPGA) circuits, and other type of electronic circuits.

Figure 7:
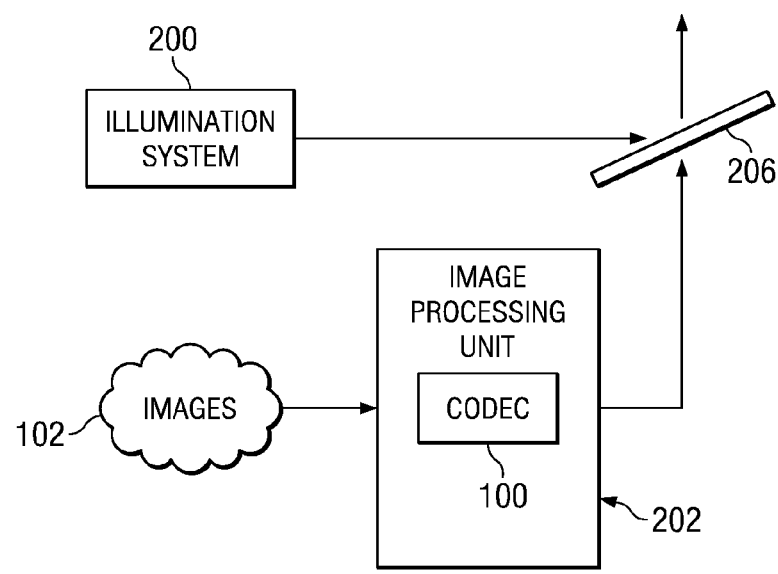
FIG. 7 schematically illustrates an exemplary image system in which a data compression/decompression scheme is implemented.

The above compression and decompression system can be implemented in different display systems, one of which is diagrammatically illustrated in FIG. 7. Referring to FIG. 7, the display system comprises illumination system 200 for providing illumination light, light valve 206 that comprises an array of individually addressable pixels for modulating the illumination based upon image data (e.g., bitplane data derived from the image to be displayed). The light valve pixels can be any suitable devices, such as micromirror devices, liquid crystal display (LCD) devices, liquid crystal on silicon (LCOS) devices. The light valve pixels can be other type of devices, such as self-light emitting devices (e.g. plasma cells), in which instance the illumination system may not be necessary.

The image data used by the light valve pixels are generated by image processing unit 202 that is connected to image source 102. The image source 102 contains image signals of the images to be displayed by the system.

For compressing and decompressing the image signals during the operation of the display system, image processing unit 202 further comprises a codec 100 that is designated for performing compression and decompression operations as discussed above. In particular, the codec 100 can be implemented as the compression/decompression system 100 in FIG. 1.

It will be appreciated by those of skill in the art that a new and useful data compression/decompression method and circuits thereof have been described herein. In view of the many possible embodiments, however, it should be recognized that the embodiments described herein with respect to the drawing figures are meant to be illustrative only and should not be taken as limiting the scope of what is claimed. Those of skill in the art will recognize that the illustrated embodiments can be modified in arrangement and detail. Therefore, the devices and methods as described herein contemplate all such embodiments as may come within the scope of the following claims and equivalents thereof.

I claim:

1. A method for processing a stream of pixel data of a plurality of image pixels, comprising:
   a) providing a content-addressable memory (CAM) mapping table;
   b) initializing the CAM mapping table to receive new entries;
   c) receiving a set of pixel data of one of the plurality of image pixels of an image;
   determining whether there already exists a data entry in the mapping table for data matching the received set of pixel data;
   d) if there already exists an entry, compressing the received set of pixel data using an index to the already existing entry;
   e) if there does not already exist an entry and there is space left in the CAM mapping table, generating a new data entry in the mapping table corresponding to the received set of pixel data, and compressing the received pixel data using an index to the new data entry;

f) if there does not already exist an entry and there is no space left in the CAM mapping table, compressing the received set of pixel data using an index to an already existing entry corresponding to a previously received non-matching set of pixel data; and g) repeating steps c) through f) for subsequent sets of pixel data received of others of the plurality of image pixels of the image.

2. The method of claim 1, further comprising:
receiving a set of pixel data of another one of the plurality of image pixels corresponding to first image pixel in a row of the image;
setting the set of pixel data of the first image pixel to represent a black color; and
assigning an index for the black color to the received first image pixel data.

3. The method of claim 1, wherein the mapping table comprises a first bit portion having bits that are assigned for compressing, and a second bit portion having at least one bit that is not assigned for compressing.

4. The method of claim 3, wherein the number of bits in the second bit portion varies dynamically.

5. A method for processing a stream of correlated digital data with each digital data comprising a number of digital bits, comprising:
dividing the stream of digital data into a plurality of data sections with each data section comprising at least one digital data;
sequentially loading the digital data in one data section; and
compressing the loaded digital data using a mapping table such that the mapping table stores only unique data states of the loaded digital data, and each entry in the mapping table corresponds to an index; and
refreshing the mapping table upon receipt of digital data in another data section;
wherein the step of compressing the loaded digital data further comprises:
detecting the data state of the received digital data;
when it is determined that there is already an entry in the mapping table matching the received pixel data state, compressing the received digital data based on an index to the already existing data entry in the mapping table;
when it is determined that there is no entry in the mapping table matching the received pixel data state and that there is space left in the mapping table, generating a new data entry corresponding to the received digital data in the mapping table and compressing the received digital data based on an index to the new data entry in the mapping table; and
when it is determined that there is no entry in the mapping table matching the received pixel data state and that there is no space left in the mapping table, compressing the received digital data based on an index to an already existing entry in the mapping table corresponding to previously received digital data with a non-matching pixel data state.

6. The method of claim 5, wherein the mapping table is a content-addressable memory; and the index is a location of the new or already existing entry in the content-addressable memory.

7. The method of claim 5, further comprising:
decompressing the compressed digital data, comprising:
loading a code that comprises the index, and a content in the content-addressable memory into a decoder; and
decompressing the compressed digital data with the decoder using the loaded code and content.

8. The method of claim 5, wherein the mapping table comprises a first bit portion having bits that are assigned for compressing, and a second bit portion having at least one bit that is not assigned for compressing.

9. The method of claim 1, further comprising:
decompressing the compressed sets of pixel data, comprising:
loading a code that comprises the indices and the contents of the data entries in the CAM mapping table into a decoder; and
decompressing the compressed sets of pixel data with the decoder using the loaded code and contents.

10. The method of claim 1, wherein the stream of pixel data represents a stream of pixel data corresponding to a first image frame; and further comprising repeating steps b) through g) for a second stream of pixel data corresponding to a second image frame.

11. The method of claim 10, wherein, if there does not already exist an entry and there is no space left in the CAM mapping table, the received set of pixel data is compressed using the index used for a previously received set of pixel data corresponding to a neighboring image pixel.

12. The method of claim 11, wherein the neighboring image pixel is a left-neighbor image pixel.

13. The method of claim 12, wherein, if there does not already exist an entry and there is no space left in the CAM mapping table, the received set of pixel data is compressed using an index corresponding to a black image pixel if the one of the plurality of image pixels corresponds to a leftmost pixel of a row.

14. The method of claim 1, wherein, if a number of determinations that there does not already exist an entry matching the received set of pixel data and that there is no space left in the CAM mapping is equal to or larger than a given threshold, the CAM mapping table is reinitialized to receive new entries.

* * * * *